US007669205B2

(12) United States Patent
Ghanaie-Sichanie et al.

(10) Patent No.: US 7,669,205 B2
(45) Date of Patent: Feb. 23, 2010

(54) USING MESSAGES TO EXTEND CRM FUNCTIONALITY

(75) Inventors: Arash Ghanaie-Sichanie, Bothell, WA (US); Alexander Tkatch, Sammamish, WA (US); Kevin M. Whittenberger, Woodinville, WA (US); Michael J. Ott, Redmond, WA (US); Michaeljon Miller, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 772 days.

(21) Appl. No.: 11/290,078

(22) Filed: Nov. 30, 2005

(65) Prior Publication Data
US 2007/0006237 A1 Jan. 4, 2007

Related U.S. Application Data

(60) Provisional application No. 60/695,958, filed on Jul. 1, 2005.

(51) Int. Cl.
*G06F 13/00* (2006.01)
(52) U.S. Cl. ..................... 719/313; 719/328; 719/330
(58) Field of Classification Search ............ 719/313, 719/328, 330
See application file for complete search history.

(56) References Cited

U.S. PATENT DOCUMENTS

| 2002/0133392 | A1* | 9/2002 | Angel et al. |
| 2004/0158455 | A1* | 8/2004 | Spivack et al. |
| 2004/0194112 | A1* | 9/2004 | Whittenberger et al. |
| 2005/0027575 | A1* | 2/2005 | Amitabh et al. |
| 2005/0114159 | A1* | 5/2005 | Ozugur et al. |
| 2005/0204359 | A1* | 9/2005 | Beunings et al. ............ 719/313 |
| 2006/0150200 | A1* | 7/2006 | Cohen et al. ................ 719/328 |

OTHER PUBLICATIONS

International Search Report for PCT/US06/26008 mailed Jan. 10, 2007.*
Written Opinion for PCT/US06/26008 mailed Jan. 10, 2007.*

* cited by examiner

*Primary Examiner*—Andy Ho
(74) *Attorney, Agent, or Firm*—Marshall, Gerstein & Borun LLP

(57) ABSTRACT

A method of extending the functionality of an API in a CRM program and system to implement the method is disclosed. The method may allow a user to use request and response messages to be communicated with a single interface that may be exposed as a CRM web service module to create new business logic and operations by extending previously defined classes.

15 Claims, 6 Drawing Sheets

USING MESSAGES TO EXTEND CRM FUNCTIONALITY

This is a non-provisional of U.S. Provisional Application Ser. No. 60/695,958, filed Jul. 1, 2005, the entire disclosure of which is incorporated herein by reference.

BACKGROUND

Typical business applications may have a number of business entities and may be capable of performing various operations on those entities based on business logic. Such applications provide an Application Programming Interface (API) that allows access to and execution of business logic related to those entities. As interoperability is a critical requirement in business applications, Web Service technology may be used to design the APIs. Consumers of the API are dependent on the signature of the API and are impacted when changes are made to the APIs during its life cycle. Also proportionate to the number of business entities that exist in such applications, a similar number of static operations (methods) are defined and made available through the API.

SUMMARY

A method of extending the functionality of an API in a CRM program and system to implement the method is disclosed. The method may allow a user to use request and response messages to be communicated with a CRM web service module to create new business logic and operations by extending previously defined classes and through a single API interface. Target base classes are created by separating the business entities into categories based on the business operations supported by the category and wherein the target class hierarchy can be reviewed to determine what business entities support which operations.

DRAWINGS

Figure 3:
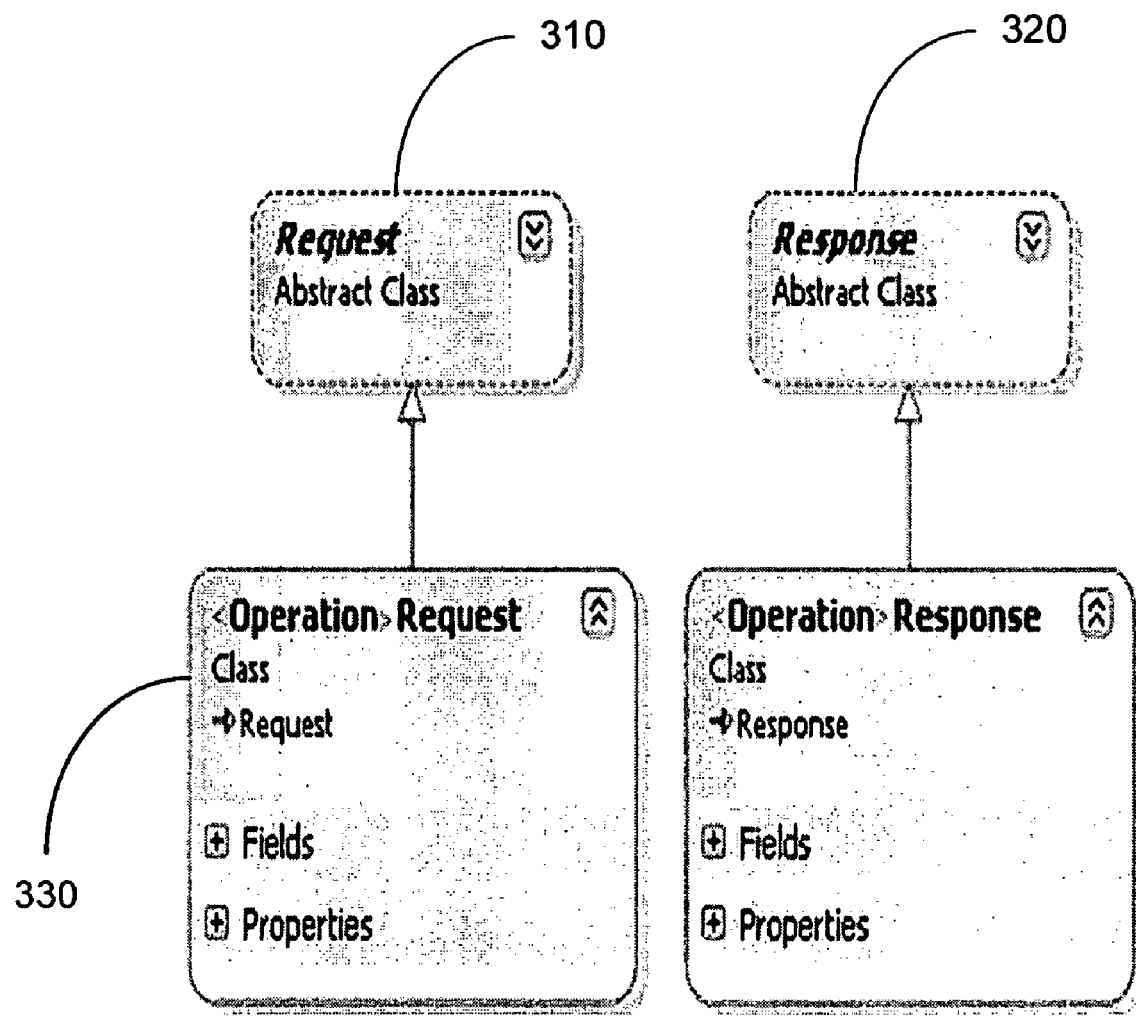
Figure 4:
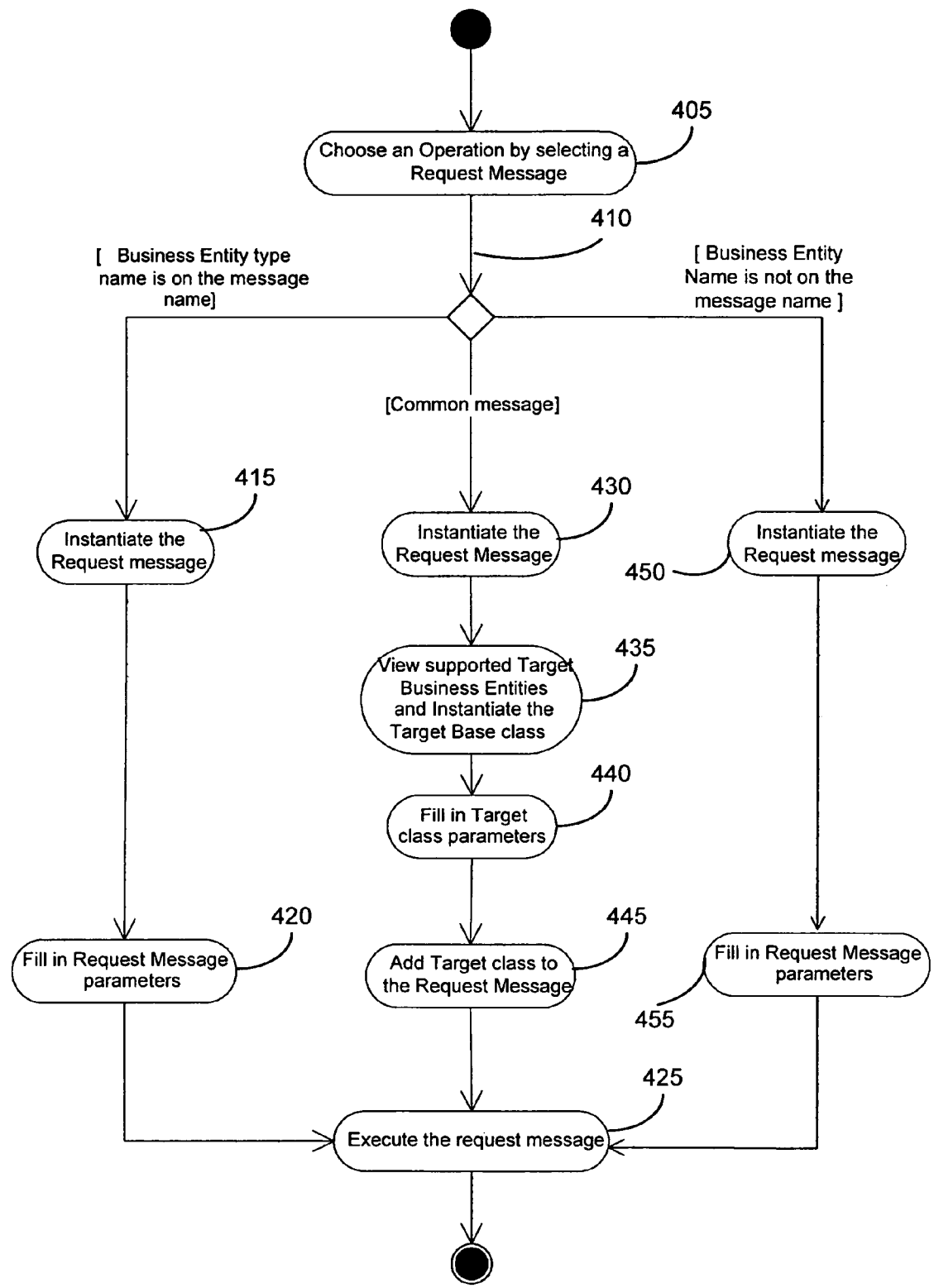
Figure 5:
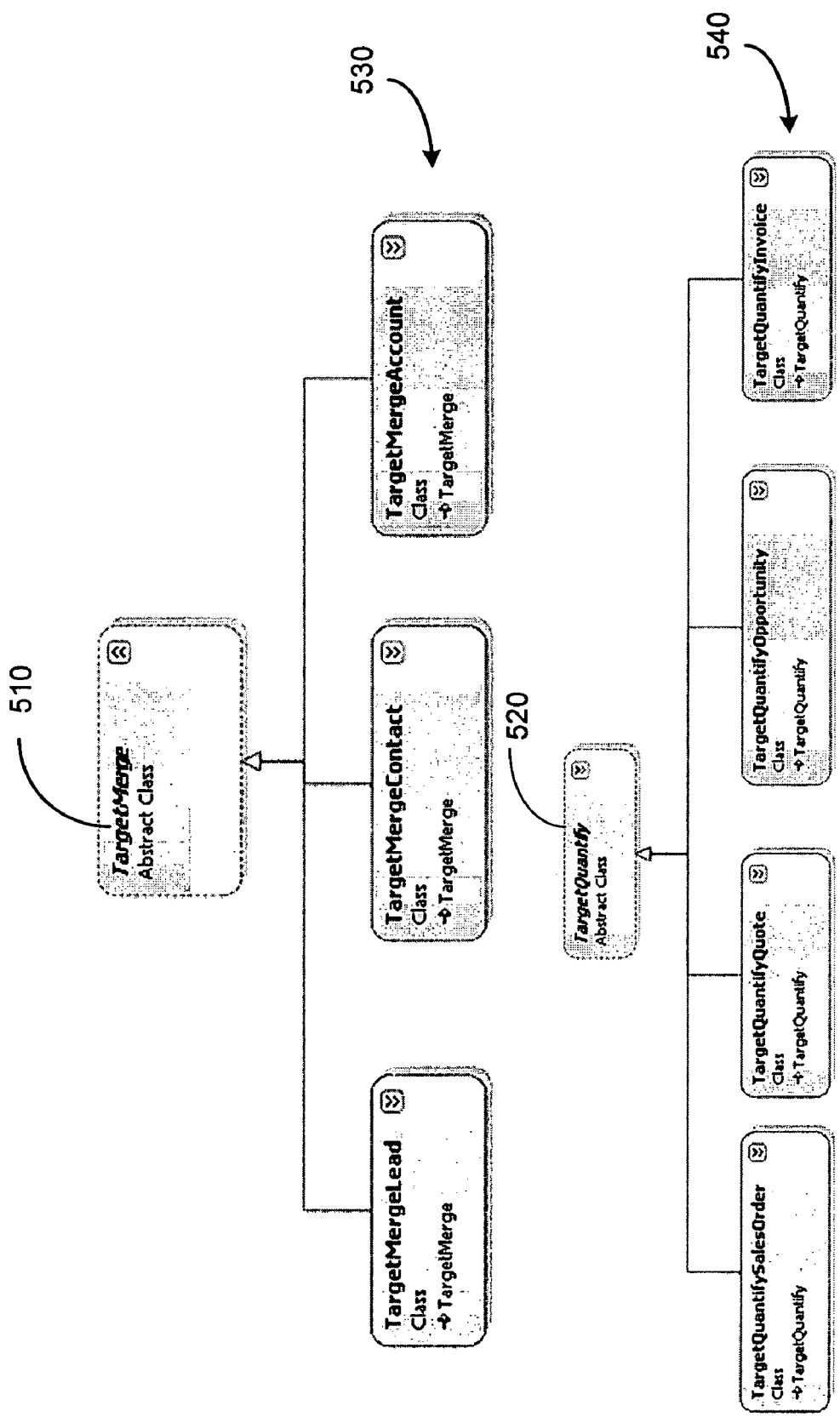
Figure 6:
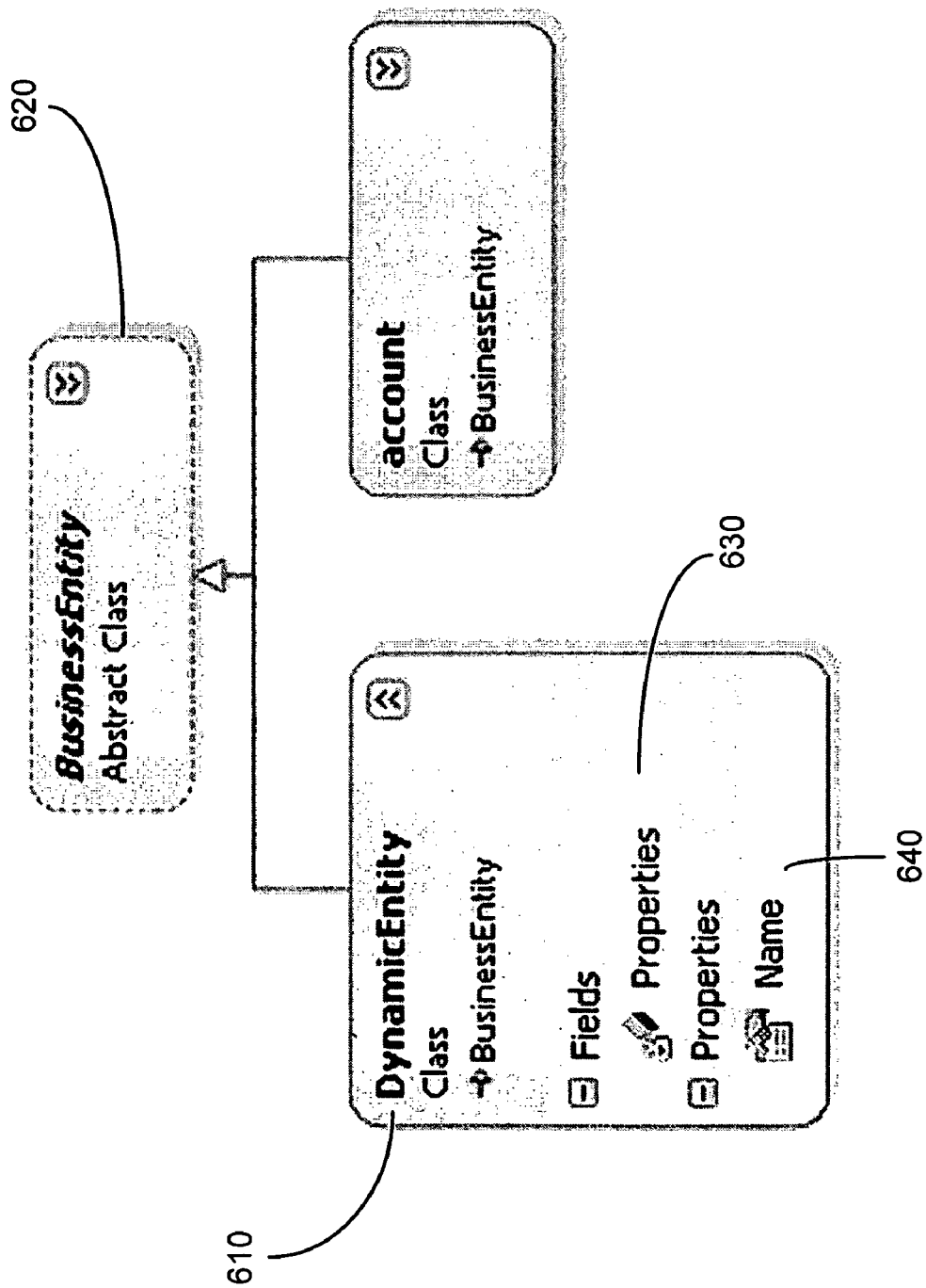

FIG. 3 may be an illustration of a conceptual view of the message centric approach;

FIG. 4 may be a class diagram that illustrates the class hierarchy of Request and Response messages that are used in conjunction with the Execute method;

FIG. 5 may illustrate a method of using messages to extend functionality of an application programming interface in a CRM system; and FIG. 6 may illustrate the Target class hierarchy for two examples.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
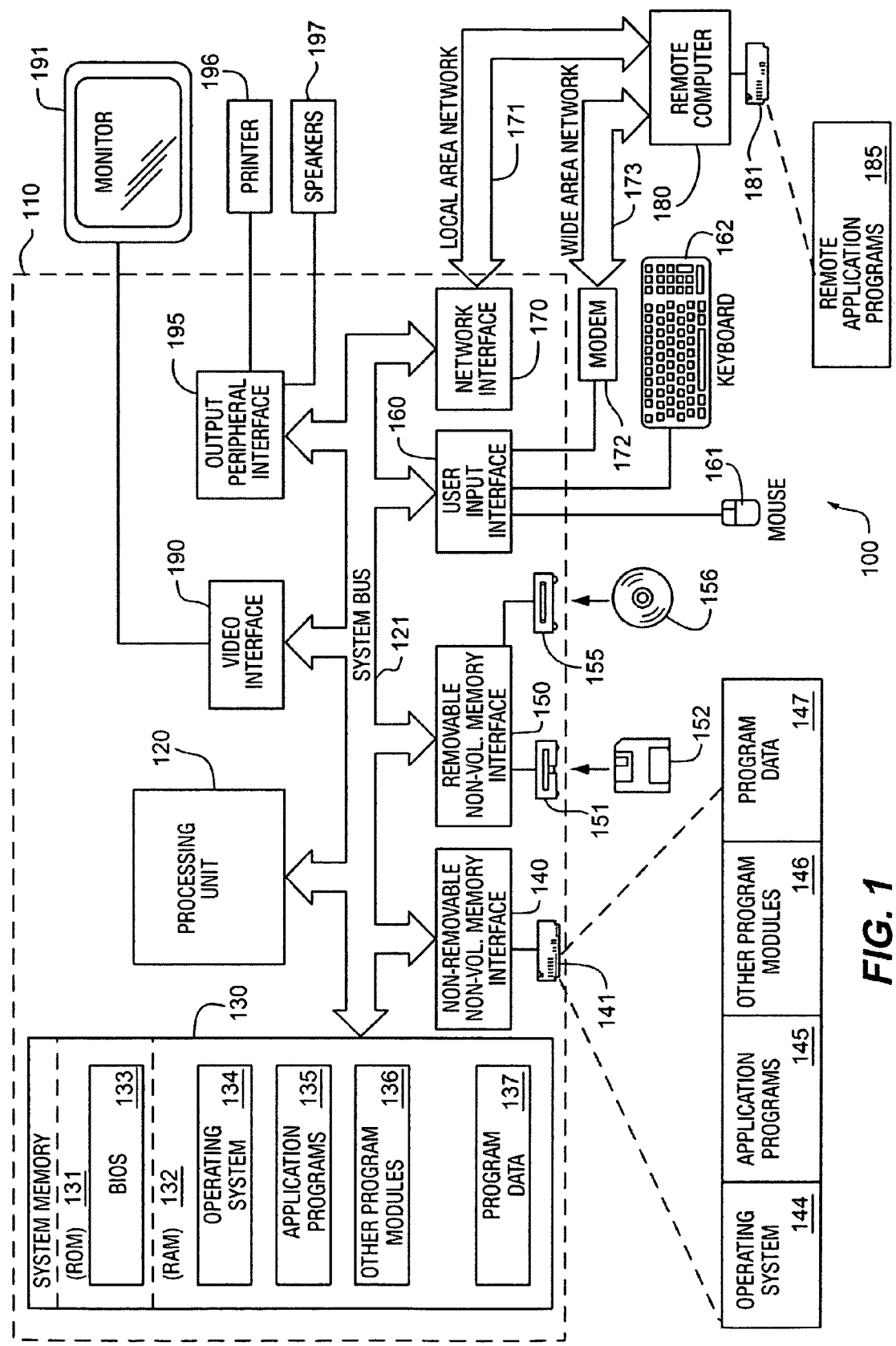
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Typical business applications may have a number of business entities and may be capable of performing various operations on those entities based on business logic. Such applications provide an Application Programming Interface (API) that allows access to and execution of business logic related to those entities. An API may be a set of programs, code libraries, or interfaces used by developers to interact with a hardware device, network, operating system, software library, or application. As interoperability is a critical requirement in business applications, Web Service technology may be used to design the APIs. Consumers of the API are dependent on the signature of the API and are impacted when changes are made to the APIs during its life cycle. Also proportionate to the number of business entities that exist in such applications, a similar number of static operations (methods) are defined and made available through the API. This model is difficult to extend for several reasons:

1. Any change to the API requires a change to all its consumers. Method based extensibility not very versatile and cost effective. In order to extend such APIs, new methods need to be added to the API set;

2. Any change to the type system supported by the API requires a change to the API implementation and all consumers;

3. Ongoing complexity and cost of managing and maintaining a large number of methods;

4. Ongoing cost and complexity of managing the consistency of operations and data across different types of business entities;

5. Longevity of the APIs and its lifetime through a number of different versions of the application;

6. The programming model and development experience could be complex due to the large number of messages and/or types in the API;

7. Often the customizations and the new types (e.g. new Business Entities) that are introduced by the end users require a different programming model compared to the system Business Entities;

8. End users of the API can not easily extend the API functionality; and

9. Work flow and business processes can not be easily integrated with the API.

A Message-Oriented approach creates an extensibility point that addresses all the problems mentioned and provides a framework that allows new business logic to be implemented through new messages. This method accepts arbitrary messages, even messages defined after the implementation, without modification of the API signature or type system. The Message-Oriented approach has the following advantages:

1. Any change to the API may be implemented by addition of a new message without changing the signature of the method or impacting the existing consumers of the method;

2. System types can be extended without breaking the existing consumers;

3. A relatively large number of business entities and business logic can be consolidated in a well organized, browseable list of messages in the development environment as a way to improve the usability and development experience;

4. Ongoing cost and complexity of managing the consistency of operations and data across different types of business entities can be significantly reduced via a simple message class hierarchy;

5. Longevity of the APIs and its lifetime is improved due to a single extensibility point: messages;

6. The customization and the new types (e.g. new Business Entities) that are introduced by the end users may fit into the message class hierarchy and be consumed with the same programming model compared to the system Business Entities;

7. The API and its functionality can easily be extended by defining new messages; and 8. Work flow and business processes can be easily integrated with the API through a set of newly defined messages that include the workflow recipes and process descriptions.

Figure 2:
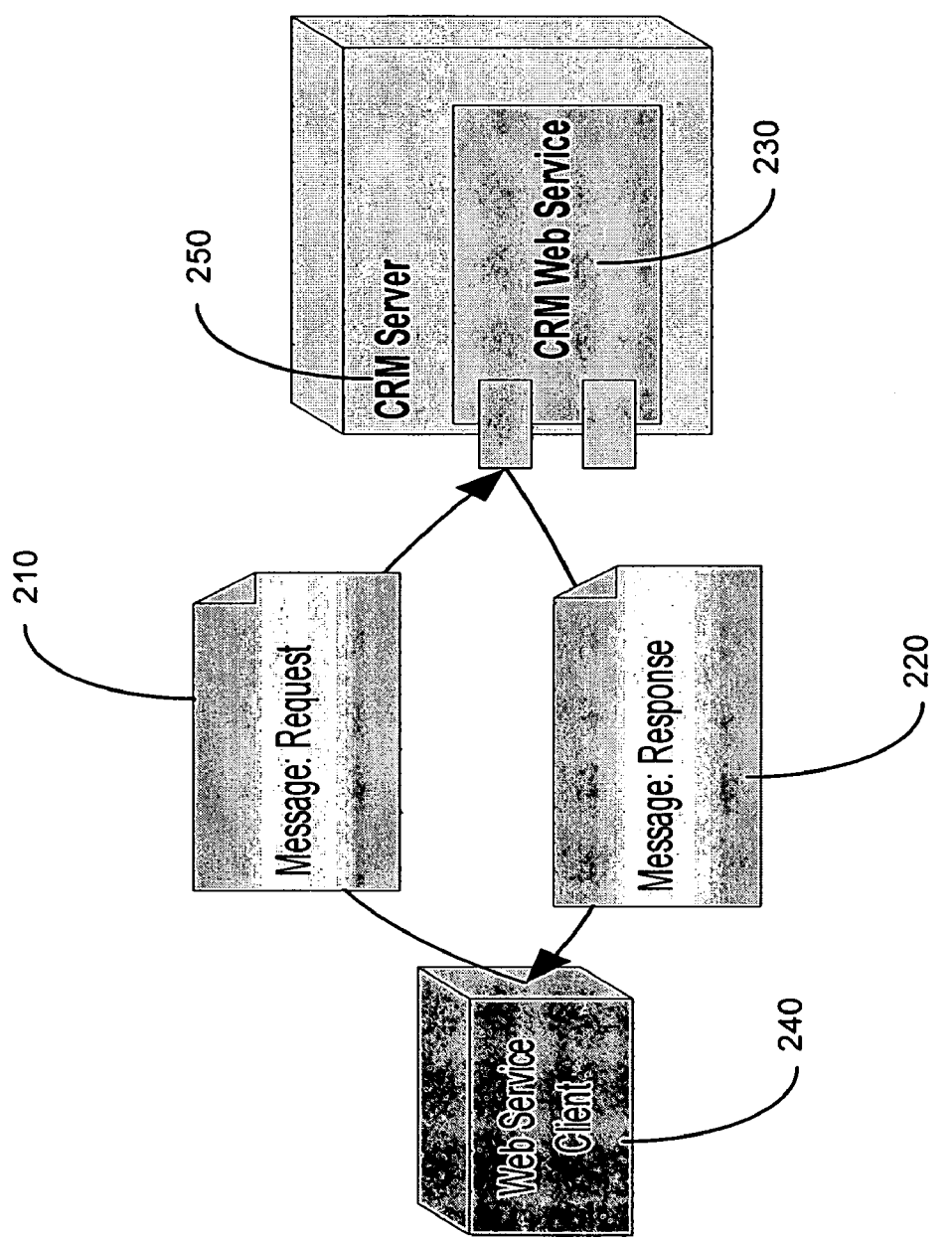
FIG. 2 is an illustration of a message-oriented API that may allow the users of the business application to execute business logic and access the business operation and data via messages.

A message-oriented API may allow the users of the business application to execute business logic and access the business operation and data via messages. FIG. 2 may be an illustration of the design of such a system, for example, in a customer relationship management ("CRM") system. CRM may be a way to maintain having the ability to organize and maintain a connection with clients, customers and service agents with regards to business relationships and customer satisfaction and a CRM application may be an acronym for customer relation management application which are programs by which a customer can be profiled and tracked to assist a sales staff in providing better service for that customer, resulting in improved customer relations overall.

The CRM web service 200 may be the interface that users of the business application use. The interface exposes the new messages (extension) that have been added to the CRM system after customization as well as the original messages that initially were included in the system through the same interface. The same interface and programming model that is used for the system original business Entities is used for custom Business Entities providing a seamless programming experience. This web service 200 has a well defined web service description provided for in Web Service Definition Language (WSDL) and may be defined in any other desired definition language. WSDL may be an XML-based contract language for describing the network services offered by a Web service provider via UDDI. UDDI stands for Universal Description, Discovery, and Integration and may be an XML and SOAP-based lookup service for Web service consumers to locate Web Services and programmable resources available on a network. WSDL may describe a Web service to Web service consumers by its public methods, data types of all parameters, return value, and bindings. SOAP stands for Simple Object Access Protocol which may be a lightweight, XML-based messaging protocol used to encode the information in Web service request and response messages before sending them over a network. SOAP messages may be independent of any operating system or protocol, and may be transported using a variety of Internet protocols, including SMTP, MIME, and HTTP. The WSDL is dynamically generated for the users of the system and enables them to access the web service and program against it.

The system may have a single web service method, called Execute. An example may look like:

[WebMethod] Public Response Execute (Request Request)

The same method and interface may be used to work with various business entities and business operations and data in the system. The Execute method may take Request messages 210 and return Response messages 220. Request messages may be instantiated and built by a client of the CRM web service 230. The caller may send the message to the CRM platform by calling the Execute method on the Web service 230. The message may be serialized into a SOAP packet by the client 240 before being sent to the CRM web service 200 and then deserialized back to the message object on the CRM Web platform. The message may then be sent to the server 250 and processed there. The result of message processing may be returned to the caller of the Execute web method via a response message 220. Both request and response message content may be strongly typed allowing the caller to use a better development environment support when working with types. It also should be noted that SOAP is one of the available protocols for exchanging structured information in a decentralized, distributed environment, but that any appropriate protocol may be used.

FIG. 3 may be a class diagram that illustrates the class hierarchy of Request and Response messages that are used in conjunction with the Execute method. There will be several classes derived from the Request message to represent different business operations that are supported by the CRM system. Each Request derived class has a corresponding Response derived class. For example CreateRequest class is derived from the Request class and corresponds to CreateResponse class that is derived from the Response class. As a general rule, the parameters on a typical web method may be mapped into members of the Request messages 310 and return parameters of a typical web method may be mapped to the members of the Response message 320. All the supported business operations and business logic may be exposed via subclasses of Request messages 330 and may be postfixed with the Request and Response keywords. The messages may all start with the Operation name where Operation is a supported business operation in CRM platform. Both of these naming conventions enables easy browsing of the messages in the development environment and improved the API usability.

FIG. 4 may illustrate a method of using messages to extend functionality of an application programming interface in a CRM system. At block 405, the method may select an operation where the operation is a CRM operation. As the message-oriented design is process centric, the programming experience may start by the developer choosing the desired business operation (Create an Account, Merge an Account, Send an Email) through selecting a concrete Request message.

At block 405, the method may communicate a request message based on the selected operation. The communication may occur over any wired or wireless channel using a communication protocol appropriate for the channel chosen. As explained previously, the method may take Request messages and return Response messages. Request messages may be instantiated and built by a client of the CRM web service. The caller may send the message to the CRM platform by calling the Execute method on the web service. The message may be sent via any transport protocol, such as SOAP for example, to the CRM server and gets processed there.

At block 415, if the request message has a business entity type name as part of the request messages, this will indicate to the user that the message is only valid for that specific Business Entity, then the user may instantiate the request message; filling the request message parameters at block 420; and then sending the request message to the CRM server for processing at block 425.

At block 430, if the request message is a common request message without any business type name in the request message name, then a user may instantiate the request message. At block 435, the user may discover supported target business entities by looking at the target class type and instantiate the target base class. At block 440, the user may fill in the target class parameters to the request message. This approach ensures that the user can only execute supported operation on a given Business Entity, at design time.

At block 445, the method may add the target class to the request message and at block 425, the method may execute the request message. The result of the execution may be returned to the caller of the Execute web method via a response message. Both request and response message content may be strongly typed allowing the caller to use a better development environment support when working with types. Of course, this is just one way of executing the method and other ways are possible.

At block 450 a user may instantiate a request message that has no references to any business entity, neither in the request message name nor in the request message class. This type of message is business entity agnostic and may be used to execute generic operations that do not necessarily require any reference to a business entity. At block 455, the method may fill in the request message parameters; and then the request message may be sent to the CRM server for processing at block 425.

The API may be extended via new messages. As all the new messages are derived from the base Request and Response messages adding new messages does not require changing of the method signature. For example, one version of CRM can have the ability to send an email by exposing the SendEmailRequest message and the later on add a new functionality to send a fax via a telephone line by simply adding a new message called SendFaxRequest. Both messages are derived from the base Request class and therefore do not require a change in the Execute method. Also the existence of class hierarchy may allow the serialization and deserialization of the messages to happen properly on both the client and server.

Polymorphism on the request message hierarchy may mean that the same interface can be used for multiple business entity types without the need of creating a new and separate interface for each business entity. For example a CreateRequest can be used to create new instances of different types of business entities via the same message and the same Execute method. This is one of advantages of message oriented approach.

Different types of messages may be defined in the system to satisfy different types of business operations that are provided in a business application. Some messages represent common operations and apply to most of the business entities in the system while some other messages are more targeted towards a specific set of business entities. A developer that uses a business application API may need to discover what business entities are supported on what business operation in the design environment and without making reference to documentation. The disclosed system may be addressed via Target classes and business entity Categories. Target classes may enable a developer to identify what messages are supported for which business entities. The business entities may be grouped under different categories based on the business operation that are supported by the category and for each group a Target base class is created.

FIG. 5 may illustrate the Target class hierarchy for two examples. TargetMerge 510 and TargetQuantify 520 each represent a business entity category that may support a number of operations. Each business entity that belongs to the category has a Target class derived from these classes. For example in TargetMerge case, TargetMergeAccount class is a derived class that shows the Account business entity is a member of TragetMerge category. With this class hierarchy, the user of the API may be enabled to programmatically or by using tools in their development environment browse the Target class hierarchy and discover all the supported configurations without need of documentation.

Sample code to execute the merge operation may be as follows:

//1) Create a Merge Request
MergeRequest myMergeReq=new MergeRequest( );
//2) The type of Target field of MergeRequest is TargetMerge so the derived classes
//are named as TargetMerge<Business Entity Name>. Create an instance of a class derived from TargetMerge that corresponds to a selected Business Entity.
TargetMergeAccount myTargetFirstAccount=new TargetMergeAccount( );
mytargetFirstAccount.EntityId=accountId;
//3) Set the Target on the Request message
myMergeReq.Target=myTargetFirstAccount;
myMergeReq.SubordinateId=subordinateId;
myMergeReq.PerformParentingChecks=true;

//4) Execute the Merge Request, type of Response message will be MergeResponse.

MergeResponse myMergeRes=(MergeResponse)myService.Execute(myMergeReq);

The customization integration with the programming model may be seamless and consistent with the rest of the programming model. The CRM system may allow the users to add new business entities to the system. The addition of business entities to the system may automatically trigger generation of new types and messages in the service definition of the CRM web service and extends the hierarchy of messages. This may allow the developers to work with both original and customized strongly typed business entity classes and messages that accept these classes and enable execution of business logic and operation on them.

Another example of code to create and instance of a new business entity that already added as part of customization follows:

//User company FAB has created a custom business Entity in the system named //fab_Vendor. The user gets the same experience as working with system entities
//Business Operation is Update
fab_vendor myVendor=new fab_vendor( );
Key myVendorKey=new Key( );
myVendorKey.Value=new Guid("{EF687190-6F85-4455-B225-93BF842425DD}");
myVendor.fab_description="A trusted vendor that provides safety equipment for Bikes";
myVendor.fab_preference=new PickList( );
myVendor.fab_preference.Value=2;
UpdateRequest myUpdateRequest=new UpdateRequest( );
TargetUpdateFab_Vendor myVendorTarget=new TargetUpdateFab_Vendor( );
myVendorTarget.fab_vendor=myVendor;
myUpdateRequest.Target=myVendorTarget;
UpdateResponse myVendorResponse=(UpdateResponse)myService.Execute(myUpdateRequest);

FIG. 6 may illustrate a class diagram for DynamicEntity 610, a new business entity, and its members. This class may be a peer to rest of the CRM Business Entities that are also derived from BusinessEntity 620. DynamicEntity 610 may be a new class derived from BusinessEntity 620 that allows an entity instance to be programmed against without having the full definition of the entity in the description of CRM web service available in WSDL language. DynamicEntity 610 may have an array of strongly typed properties (Properties) 630 that represent the entity attributes and a name (Name) 640 that represent the logical name of the entity. As the DynamicEntity 610 class is exposed in the WSDL as a class with an array of properties, a user of the API may create instances of this class and set the name of it to any desired business entity (system or custom, included or not included in the WSDL) and add any desired properties (included or not included in the WSDL) to the array without getting any compile/design time errors. At runtime, the content of the properties array will be evaluated and if the entity name does not exist or the properties named in the array is not recognized a runtime exception may be thrown.

Code to define DynamicEntity may be as follows:

```
public class DynamicEntity : BusinessEntity
{
    Property[] Properties;
    public string Name
}
```

The DynamicEntity class 610 may extend the API beyond the strongly typed classes and may provide a generic and extensible way to work with business entities and execute their business logic. A user may decide to use the strongly typed business entities classes DynamicEntity 610 format. A user also may decide to receive the results of the business operations execution in strongly typed BusinessEntities 620 objects or DynamicEntity 610 format. The benefit of DynamicEntity 610 is that at the design time, the user does not need to have fully described web service definition of the specific business entity type and can develop code that dynamically and at runtime discovers various defined business entities in a targeted CRM implementation and work with those entities (execute operations) without having their definitions at design/compile time.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of using messages to extend functionality of an application programming interface in a customer relationship management ("CRM") system comprising:
    selecting an operation where the operation is a CRM operation;
    communicating to a CRM web service a request message based on the selected operation;
    if the request message has a business entity type name in the request message name, then the request message is only valid for the named entity:
        instantiating the request message;
        assigning the request message fields; and
        executing the request message;
    if the request message is a common request message without a business type name in the request message name, and the request message has a target property:
        instantiating the request message;
        selecting and instantiating one of the supported target classes;
        assigning the target class fields;
        assigning the request message fields;
        associating target class with the request message; and,
        executing the request message;
    if the request message name does not include a business entity name nor the message has a target property:
        instantiating the request message;
        assigning the request message fields; and
        executing the request message.

2. The method according to claim 1, wherein all the new messages are derived from the base request and response classes.

3. The method according to claim 1, wherein the method is executed by communicating a request message and returning a response message.

4. The method according to claim 1, wherein the request messages are instantiated and built by a client of a CRM web service.

5. The method according to claim 1, wherein the message is transmitted to the CRM web service via a transport protocol.

6. The method according to claim 1, wherein business operations are assigned to business entities.

7. The method according to claim 1, wherein target base classes are created by separating the business entities into categories based on the business operations supported by the category.

8. The method according to claim 1, wherein the target class hierarchy is used to determine what business entities support which operations.

9. A computing apparatus, comprising:
a display unit that is capable of generating video images;
an input device;
a processing apparatus operatively coupled to said display unit and said input device, said processing apparatus comprising a processor and a memory operatively coupled to said processor,
a network interface connected to a network and to the processing apparatus;
said processing apparatus being programmed for
selecting an operation where the operation is a customer relationship management ("CRM") operation;
communicating to a CRM web service via a transport protocol a request message based on the selected operation;
if the request message has a business entity type name in the request message name, then the request message is only valid for the named entity:
instantiating the request message;
assigning the request message fields; and
executing the request message;
if the request message is a common request message without a business type name in the request message name, and the request message has a target property:
instantiating the request message;
selecting and instantiating one of the supported target classes;
assigning the target class fields;
assigning the request message fields;
associating target class with the request message; and,
executing the request message;
if the request message name does not include a business entity name nor the message has a target property:
instantiating the request message;
assigning the request message fields; and
executing the request message.

10. The computing apparatus of claim 9, wherein the request messages are instantiated and built by a client of a CRM web service.

11. The computing apparatus of claim 9, wherein target base classes are created by separating the business entities into categories based on the business operations supported by the category and wherein the target class hierarchy can be reviewed to determine what business entities support which operations.

12. A computer readable storage medium adapted to store computer executable code to use messages to extend functionality of an application programming interface in a customer relationship management ("CRM") system wherein the computer executable code comprises computer code for:
selecting an operation where the operation is a CRM operation;
communicating to a CRM web service a request message based on the selected operation wherein the request messages are instantiated and built by a client of a CRM web service;
if the request message has a business entity type name in the request message name, then the request message is only valid for the named entity:
instantiating the request message;
assigning the request message fields; and
executing the request message;
if the request message is a common request message without a business type name in the request message name, and the request message has a target property:
instantiating the request message;
selecting and instantiating one of the supported target classes;
assigning the target class fields;
assigning the request message fields;
associating target class with the request message; and,
executing the request message;
if the request message name does not include a business entity name nor the message has a target property:
instantiating the request message;
assigning the request message fields; and
executing the request message.

13. The computer readable storage medium of claim 12, wherein the request messages are instantiated and built by a client of a CRM web service.

14. The computer readable storage medium of claim 12, wherein target base classes are created by separating the business entities into categories based on the business operations supported by the category and wherein the target class hierarchy can be reviewed to determine what business entities support which operations.

15. The computer readable storage medium of claim 12, wherein all the new messages are derived from the base request and response classes.

* * * * *